(12) United States Patent
Liu

(10) Patent No.: US 6,646,849 B1
(45) Date of Patent: Nov. 11, 2003

(54) DIGITAL POWER INVERTER AND METHOD OF CONTROLLING THE SAME

(75) Inventor: Hong-Chung Liu, Taipei Hsien (TW)

(73) Assignee: Long Well Electronics Corp., Taipei Hsien (TW)

(*) Notice: Subject to any disclaimer, the term of this patent is extended or adjusted under 35 U.S.C. 154(b) by 0 days.

(21) Appl. No.: 10/153,670

(22) Filed: May 24, 2002

(51) Int. Cl.[7] ................................................. H02H 9/08
(52) U.S. Cl. ........................ 361/93.9; 361/94; 361/90; 361/93.8
(58) Field of Search .......................... 361/93.9, 93.8, 361/92, 90, 93.7, 94, 106, 111

(56) References Cited

U.S. PATENT DOCUMENTS 4,787,007 A * 11/1988 Matsumura et al. ....... 361/91.3

6,489,742 B2 * 12/2002 Lumsden .................... 318/727

* cited by examiner

Primary Examiner—Shawn Riley
(74) Attorney, Agent, or Firm—Troxell Law Office PLLC

(57) ABSTRACT

A digital electric power inverter comprising: a CPU, a PWM driving circuit, a PWM converting circuit, a rectifying circuit, an AC driving circuit, a DC/AC inverting circuit, a plurality of detecting circuits and an alarm circuit, the power inverter is characterized by that: the entire circuitry thereof is designed to be controlled by the CPU that can accurately control these circuits to endue the power inverter with an intact and multi-selection protecting function, thus render the parts thereof to develop their largest effects.

2 Claims, 5 Drawing Sheets

DIGITAL POWER INVERTER AND METHOD OF CONTROLLING THE SAME

BACKGROUND OF THE INVENTION

1. Field of the Invention

The present invention is related to a digital electric power inverter, and especially to a DC to AC power inverter particularly suitable to be used as a protection circuit module structure to protect the elements of the power inverter from being damaged and to be able to provide the actuating power for a machine.

2. Description of the Prior Art

As shown in FIG. 1, heavy tool machines in the markets consume huge electric power when in actuating, if such a machine is to be actuated, several folds of monetary amount must be paid to purchase an electric power inverter with several folds of functional specification for actuating a small machine. For example, a sand wheel needs 200W for running, while the transient power for actuating is over 1000W; therefore, in using such a machine, an electric power inverter of 1000W must be purchased. The reason is that, a conventional electric power inverter triggers a protecting loop to shut outputting in corresponding to the detecting signal from a detecting loop when the output terminal is given a heavy load, to thereby protect the interior electronic elements; this is because that conventional designing has to trigger a protecting line according to the detecting of the output state to turn off the system to protect the product.

And a conventional electric power inverter may render the internal detecting loop thereof to mistake a case for a loading short circuit, in which case, the output terminal thereof is connected with an inductive load or in actuating a load with a larger current; thereby, a protection loop is triggered to shut outputting, to in turn make a machine not work. This is an unsolvable problem and technical bottleneck of the conventional electric power inverter in that it is unable to distinguish a short circuit from an inductive load.

In conventional designing, PWM (pulse width modulation) mostly adopts the driving mode of IC outputting; if a relatively inexpensive IC is used, the designing will be more difficult or even the specification must be degraded. For example, when a PWM converting signal has an inadequate duty and makes a larger temperature rising, the frequency must be adjusted down or the IC shall be changed to effectively improve the case.

Therefore, the motive of the present invention is to improve the conventional electric power inverters to get rid of the above stated defects, and to provide a digital electric power inverter which sufficiently uses the control character of a CPU (a microcomputer) to similarly provide a load with an output power, but the CPU turns off output in time before the output power makes the elements crumbled, in order that the elements can restore their functions; a short time after restoration, the CPU turns on output again, till it once more turns off before the elements are crumbled. The process is repeated again and again to protect the elements from being damaged, and the actuating power for a machine can be provided; this can take the place of the function of a conventional IC, and can make a large improvement in saving the cost of man work and the fineness of products.

SUMMARY OF THE INVENTION

The primary object of the present invention is to provide an accurately controlling digital electric power inverter with parts able to develop their largest effects.

To achieve the above stated object, the present invention is comprised of a CPU, a PWM driving circuit, a PWM converting circuit, a rectifying circuit, an AC driving circuit, a DC/AC inverting circuit, a plurality of detecting circuits and an alarm circuit. The present invention is characterized by that: the entire circuitry thereof is designed to be controlled by the CPU that can accurately control these circuits to endue the power inverter with an intact and multi-selection protecting function, thus to render the parts thereof to develop their largest effects.

The present invention will be apparent in its construction and other features after reading the detailed description of the preferred embodiment thereof in reference to the accompanying drawings.

DETAILED DESCRIPTION OF THE PREFERRED EMBODIMENT

Figure 1:
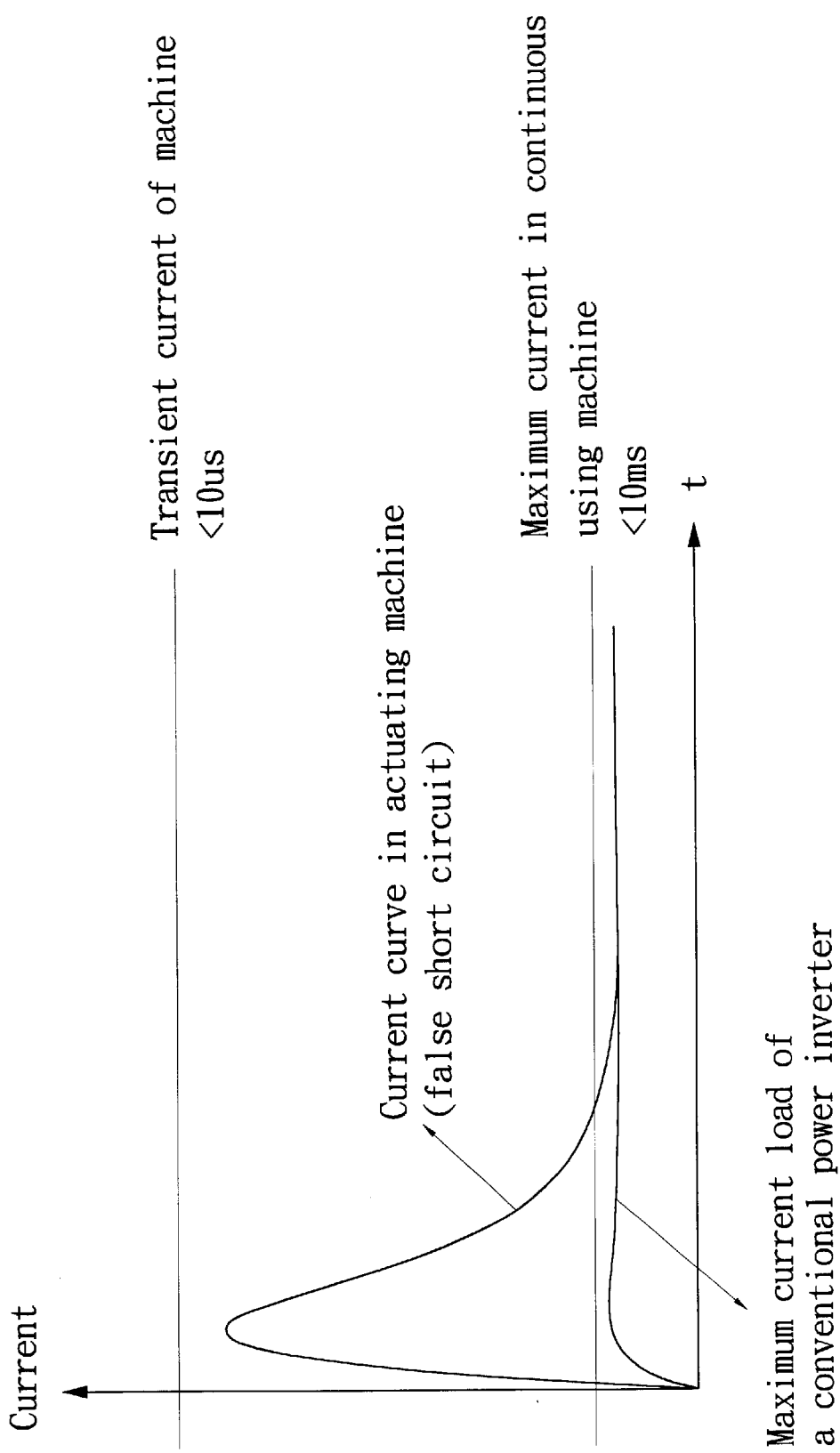
FIG. 1 is a drawing of a current vs. time coordinate showing that a conventional power inverter is unable to satisfy the requirement of a transient current supply.
Figure 2:
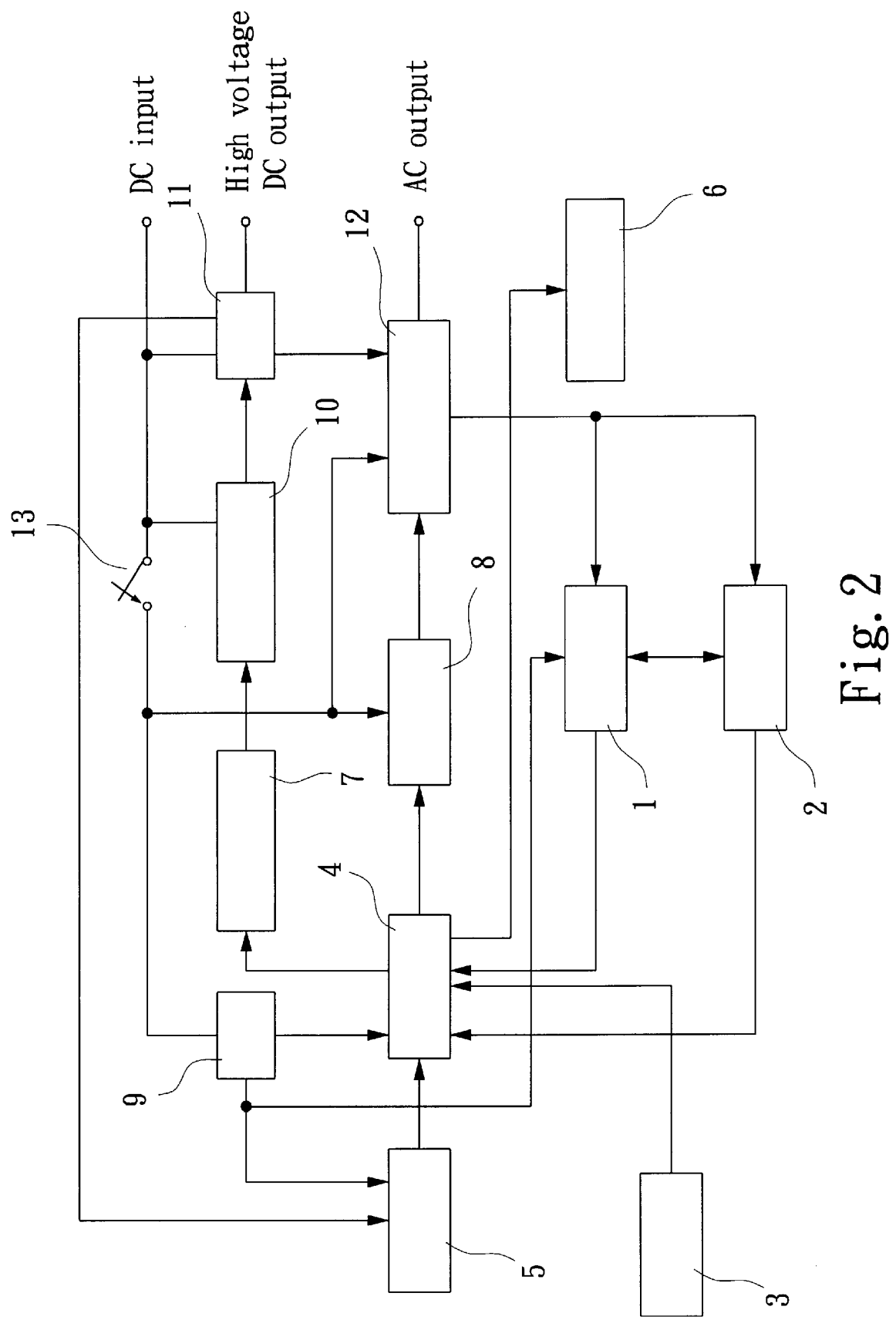
FIG. 2 is an electric block diagram showing of the present invention.
Figure 3:
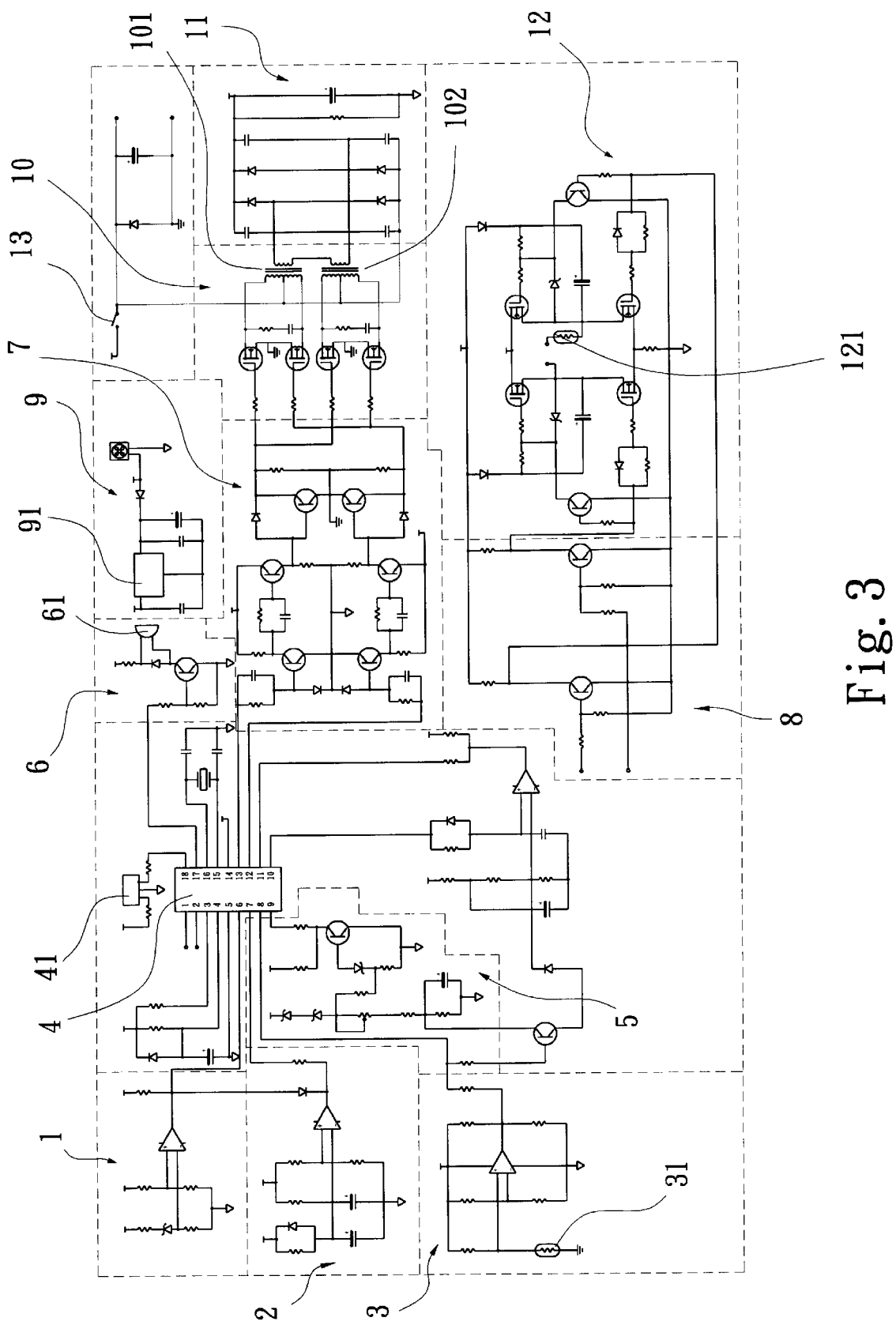
FIG. 3 shows the entire electric circuitry of the present invention.

Referring firstly to FIGS. 2 and 3, the present invention is comprised of a current detecting circuit 1, an overload detecting circuit 2, a temperature detecting circuit 3, a CPU 4, a high voltage detecting circuit 5, an alarm circuit 6, a PWM driving circuit 7, an AC driving circuit 8, a voltage regulation circuit (5V) 9, a PWM converting circuit 10, a rectifying circuit 11, a DC/AC inverting circuit 12 and a switch 13.

Wherein, the current detecting circuit 1 is connected with one end thereof to the DC/AC inverting circuit 12, with another end thereof to the CPU 4, and is comprised of an operation amplifier (OPA) connected with a Zener diode and a plurality of resistances, it is provided for detecting whether an output means a short circuit or a false short circuit;

the overload detecting circuit 2 is connected with one end thereof to the DC/AC inverting circuit 12, with another end thereof to the current detecting circuit 1 and then to the CPU 4, and is comprised of an operation amplifier (OPA), a plurality of diodes, resistances and capacitors; it is provided for detecting whether it is overloading and whether the input DC voltage is overly high or overly low;

the temperature detecting circuit 3 is connected directly to the CPU 4, and is comprised of an operation amplifier (OPA), a heat sensitive resistance 31 and other resistances; it is provided for detecting whether the temperature of the machine is overly high;

the CPU 4 includes a transistor, a plurality of resistances and capacitors, a diode, an operation amplifier (OPA) and an LED 41 composing a microcomputer control loop, and is connected with every detecting circuit to provide signals for an AC driving circuit 8 and a PWM driving circuit 7;

the high voltage detecting circuit 5 is connected with one end thereof to the rectifying circuit 11, with another end thereof to the CPU 4, and is comprised of a plurality of transistors, Zener diodes, resistances, a variable resistance and a plurality of capacitors; it is provided for detecting a high voltage state;

the alarm circuit 6 is directly connected with the CPU 4, and is comprised of a transistor, a plurality of diodes and resistances, and a buzzer 61; it is provided for detecting an abnormal state of the circuitry of the power inverter to provide a alarm;

the PWM driving circuit 7 is connected with one end thereof to the CPU 4, with another end thereof to a PWM converting circuit 10, and is comprised of a plurality of transistors, diodes, resistances and capacitors; it is provided for amplifying and reshaping the output PWM signals of the CPU 4;

the AC driving circuit 8 is connected with one end thereof to the CPU 4, with another end thereof to the DC/AC inverting circuit 12, and is comprised of a plurality of transistors and resistances; it is provided for amplifying the output AC driving signals of the CPU 4;

the voltage regulation circuit 9 is comprised of a voltage regulation IC 91, a plurality of diodes and capacitors; it is provided for power supplying for normal operation of the entire circuitry of the power inverter;

the PWM converting circuit 10 is connected with one end thereof to the PWM driving circuit 7, with another end thereof to the rectifying circuit 11, and is comprised of a plurality of FET power transistors, resistances, capacitors and two transformers 101, 102; it is directly supplied with electric power in the mode of DC inputting, and is provided for increasing the voltage of the driving signals amplified and reshaped by the PWM driving circuit 7 through the transformers to generate high frequency AC signals;

the rectifying circuit 11 is connected with one end thereof to the PWM converting circuit 10, with another end thereof to the DC/AC inverting circuit 12, it has a high voltage AC output connecting point, and is comprised of a plurality of diodes capacitors and resistances; it is directly supplied with electric power in the mode of DC inputting, and is provided for rectifying the high frequency AC signals generated by the PWM converting circuit 10 to generate an AC high voltage;

the DC/AC inverting circuit 12 is connected to receive a DC input, and is connected with the AC driving circuit 8 and the rectifying circuit 11, the other end thereof is connected separately with the current detecting circuit 1 and the overload detecting circuit 2, it further has an AC output connecting point, and is comprised of a plurality of transistors, FET power transistors, diodes, Zener diodes, resistances, capacitors and a heat sensitive resistance; it is provided for converting DC high voltage signals provided by the AC driving circuit 8 into AC high voltage output.

Thereby, the CPU 4 controls by cooperation the working of the overload detecting circuit 2, it turns off output in time before the output power makes the elements crumbled, a short time after restoration, the CPU 4 turns on output again. The process is repeated again and again intermittently to protect the elements from being damaged, and the normal working power for a machine load can be afforded, the larger actuating power for the machine can be provided. And the CPU 4 can clearly distinguish a short circuit from a false short circuit according to whether the current is always the same or is gradually reduced, and makes suitable disposing.

And a larger feature of present the invention is that, the CPU 4 is built therein with the above stated working circuits having normal values within their working scopes, in order to actively control and compare the above stated situations of the working circuits to adjust the output PWM signals and AC driving signals of them, in this way, the output PWM signals can be modulated in pursuance of the loading state of working of the loops.

The above stated circuitry assembled can make the present invention execute the following actions when the switch 13 is closed to actuate the CPU 4:

1. The CPU 4 renders the PWM driving circuit 7 to generate, amplify and reshape signals, the signals amplified and reshaped are increased in voltage by the transformers 101, 102 of the PWM converting circuit 10, the high frequency AC signals generated after increasing of voltage is rectified by the rectifying circuit 11 to get an AC high voltage.
2. The CPU 4 renders the AC driving circuit 8 to generate and amplify signals, the signals amplified renders the DC/AC inverting circuit 12 to convert DC high voltage into AC high voltage to generate an AC output.
3. The DC/AC inverting circuit 12 provides a current signal which is sent to the current detecting circuit 1 and the overload detecting circuit 2; thereby, the detecting states are respectively sent back to the CPU 4 for analysis and judgment, if they are judged as abnormal, the CPU 4 immediately adjust the PWM driving circuit 7 and the AC driving circuit 8 to protect the elements from being damaged.
4. Additionally, the CPU 4 also actively detects all the working circuits, in discovering an abnormal signal, it will send a correcting signal or a protecting signal to the PWM driving circuit 7 and the AC driving circuit 8 in no time to give full play to the protecting function.
5. The high voltage detecting circuit 5 detects a high voltage state and send the state back to the CPU 4 which execute suitable modulation for the abnormal potential state to make the power supplying state normal.

Figure 4:
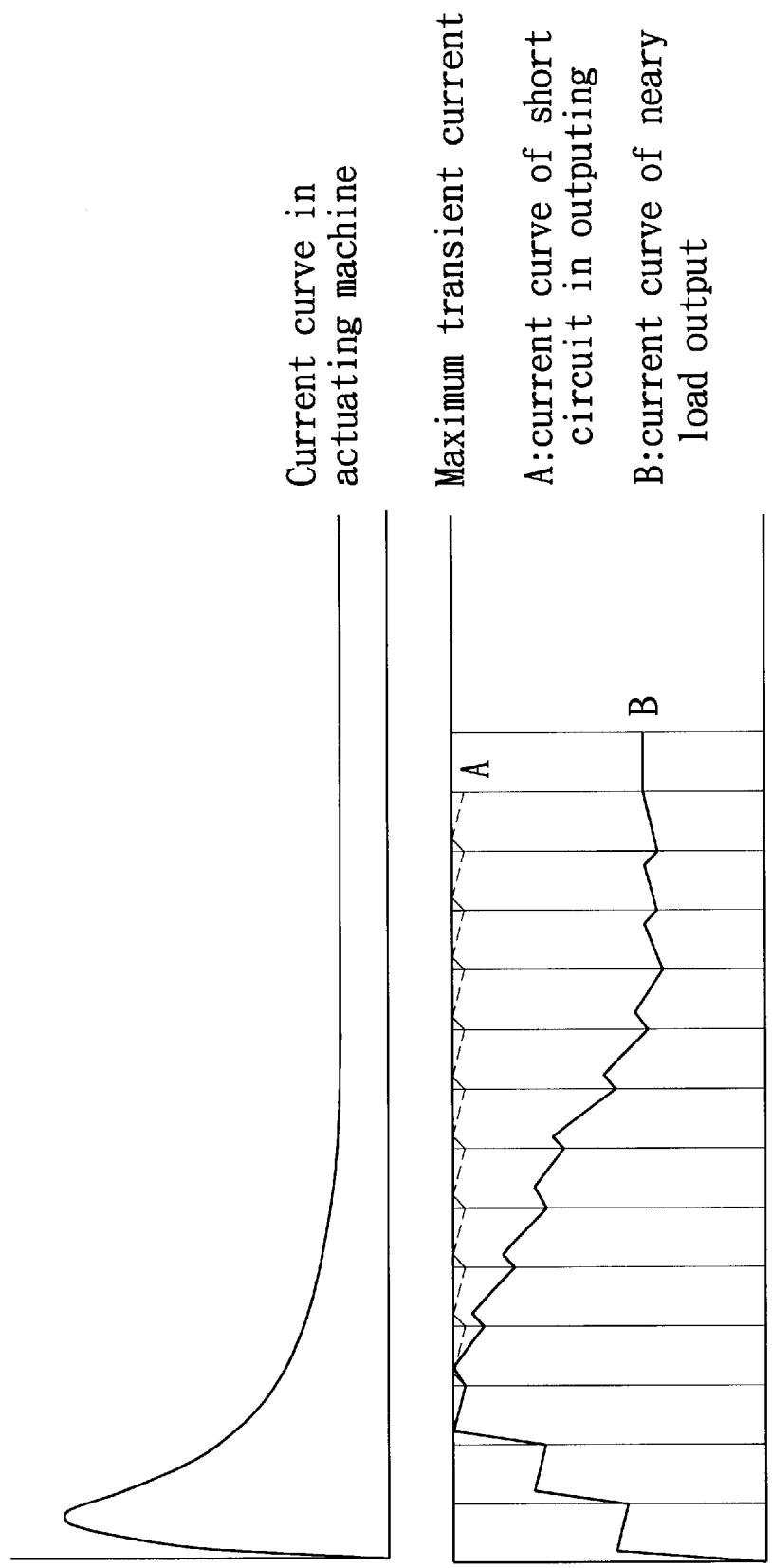
FIG. 4 is an output current curve diagram of the present invention.
Figure 5:
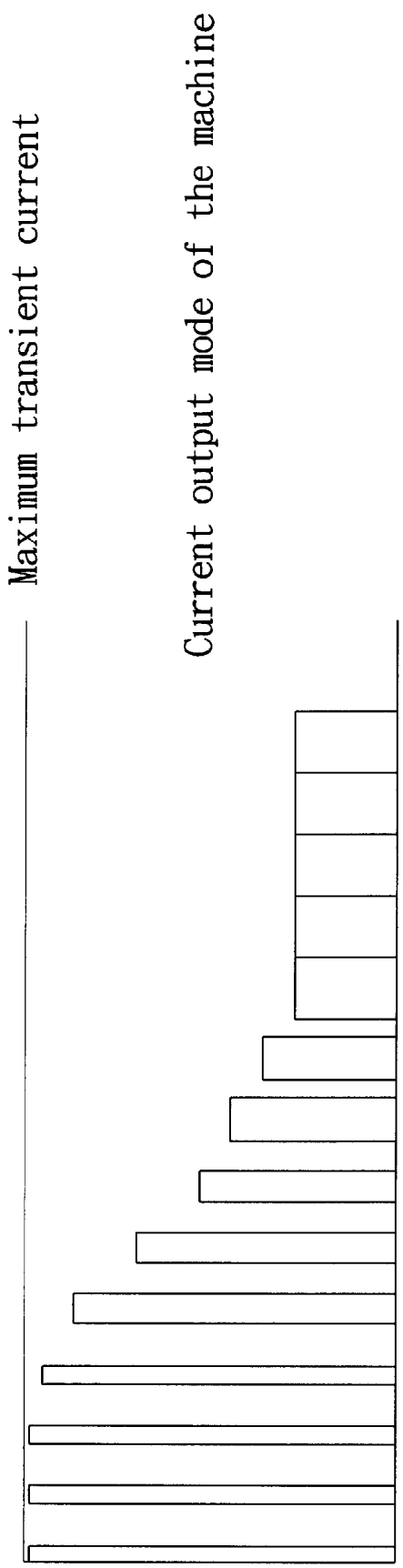
FIG. 5 is a diagram showing the mode of current output of the present invention.

Referring to FIG. 4, the present invention sufficiently utilize the characteristic of the CPU 4, thereby, when a machine with the actuating transient power of more than 200W is actuated (such as a sand wheel machine with the actuating transient power of more than 1000W), the present invention nonetheless provides a load with an output power, but the CPU 4 turns off output in time within the tolerated scope of safety before the output power makes the elements crumbled, in order that the elements can restore their functions, a short time after restoration, the CPU 4 turns on output again, till it once more turns off before the elements are crumbled. The process is repeated again and again to protect the elements from being damaged, and the actuating power for a machine can be provided. Therefore, although this is not able to provide all the power to transiently afford the machine requirement, it can gradually supply step by step the required actuating power. In view of this, this mode of operation can provide a 200W electric power inverter for actuating a 200W sand wheel machine, it does not require a 1000W electric power inverter for actuating as is the case of a conventional power inverter.

The effective designing makes the present invention intermittently control the gradually increased output to afford the larger power required for actuating in operation, and the CPU 4 can clearly distinguish a short circuit from a false short circuit according to variation of current and makes suitable disposing.

More importantly, by the fact that the CPU 4 is installed therein a software, the performance of output can be changed when the software is changed by another one, change can be made in pursuance of the requirement of the working conditions of clients without changing the electronic loops hardware after a machine body has been made, this enlarges its scope of applicability, and can largely reduce the cost induced by changing hardware and the designing work induced by changing specifications, and can thereby increase the scope of applicability.

And more, in the present invention, the signal, no matter it is a PWM output signal or an AC output signal, is controlled by the CPU; thereby, the present invention can be small, delicate and inexpensive, and can have the advantage of excellent performance.

In conclusion, the present invention is designed to control its circuits accurately by a CPU to endue the power inverter with an intact and multi-selection protecting function. Having thus described the present invention with practicability and improvement, what I claim as new and desire to be secured by Letters Patent of the United States are:

1. A method of controlling a digital electric power inverter, said method is characterized by that:
   a. said digital electric power inverter is controlled interiorly by a CPU, an overload detecting circuit, a current detecting circuit, a voltage detecting circuit and a temperature detecting circuit are provided between said CPU and an output loop;
   b. said digital electric power inverter is provided interiorly thereof with a PWM driving circuit, an AC driving circuit, a voltage regulation circuit, a PWM converting circuit, a rectifying circuit and a DC/AC inverting circuit;
   c. said CPU controls by cooperation the working of said overload detecting circuit, and turns off output in time before the output power makes the elements of said electric power inverter crumbled, a short time after restoration, said CPU turns on output again;
   d. in a mode of continuous on/off outputting, said CPU clearly distinguishes a short circuit from a false short circuit according to variation of output current detected, and makes suitable disposing of deciding whether power supplying is continued;
   e. the process of c. is repeated again and again intermittently to protect said elements from being damaged, and the normal working power for a machine load is afforded, the larger actuating power for the machine is provided;
   f. said circuits built in said CPU has normal values within their working scopes;
   g. said CPU actively controls and compares the situations of said circuits to adjust said output PWM signals and AC driving signals of them in pursuance of the loading state of working of loops.

2. A digital electric power inverter comprising:
   a current detecting circuit connected with one end thereof to a DC/AC inverting circuit and with another end thereof to a CPU for detecting whether an output means a short circuit or a false short circuit, and being comprised of an operation amplifier (OPA) connected with a Zener diode and a plurality of resistances;
   an overload detecting circuit connected with one end thereof to said DC/AC inverting circuit and with another end thereof to said current detecting circuit and then to said CPU for detecting whether it is overloading and whether the input DC voltage is overly high or overly low, and being comprised of an operation amplifier (OPA), a plurality of diodes, resistances and capacitors;
   a temperature detecting circuit connected directly to said CPU for detecting whether the temperature of a machine is overly high, and being comprised of an operation amplifier (OPA), a heat sensitive resistance and other resistances;
   said CPU including a transistor, a plurality of resistances and capacitors, a diode, an operation amplifier (OPA) and an LED, and being connected with all said detecting circuits to provide signals for an AC driving circuit and a PWM driving circuit;
   a high voltage detecting circuit connected with one end thereof to a rectifying circuit and with another end thereof to said CPU for detecting a high voltage state, and being comprised of a plurality of transistors, Zener diodes, resistances, a variable resistance and a plurality of capacitors;
   an alarm circuit directly connected with said CPU for detecting an abnormal state of said circuitry of said power inverter to provide a alarm, and being comprised of a transistor, a plurality of diodes and resistances, and a buzzer;
   said PWM driving circuit connected with one end thereof to said CPU and with another end thereof to a PWM converting circuit for amplifying and reshaping the output PWM signals of said CPU, and being comprised of a plurality of transistors, diodes, resistances and capacitors;
   said AC driving circuit connected with one end thereof to said CPU and with another end thereof to said DC/AC inverting circuit for amplifying the output AC driving signals of said CPU, and being comprised of a plurality of transistors and resistances;
   a voltage regulation circuit provided for power supplying for normal operation of the entire circuitry of said power inverter and comprised of a voltage regulation IC, a plurality of diodes and capacitors;
   said PWM converting circuit directly supplied with electric power in the mode of DC inputting, being connected with one end thereof to said PWM driving circuit and with another end thereof to said rectifying circuit, and being comprised of a plurality of FET power transistors, resistances, capacitors and two transformers, and being provided for increasing the voltage of the driving signals amplified and reshaped by said PWM driving circuit through transformers to generate high frequency AC signals;
   said rectifying circuit connected with one end thereof to said PWM converting circuit and with another end thereof to said DC/AC inverting circuit, and having a high voltage AC output connecting point, being provided for rectifying the high frequency AC signals generated by said PWM converting circuit to generate an AC high voltage, and being comprised of a plurality of diodes, capacitors and resistances, being directly supplied with electric power in the mode of DC inputting;
   said DC/AC inverting circuit comprised of a plurality of transistors, FET power transistors, diodes, Zener diodes, resistances, capacitors and a heat sensitive resistance, and being connected to receive a DC input, being connected to said AC driving circuit and said rectifying circuit and connected separately to said current detecting circuit and said overload detecting circuit, further having an AC output connecting point, and being provided for converting DC high voltage signals provided by said AC driving circuit into AC high voltage output;
   wherein, said CPU is built therein with said circuits having normal values within their working scopes, in order to actively control and compare the situations of said circuits to adjust output PWM signals and AC driving signals of them, in this way, internal electronic elements of said CPU is adapted to changing at will to fast make a machine body in pursuance of the requirement of the working conditions of clients.

* * * * *